US008587661B2

(12) United States Patent
McCubbrey

(10) Patent No.: US 8,587,661 B2
(45) Date of Patent: Nov. 19, 2013

(54) SCALABLE SYSTEM FOR WIDE AREA SURVEILLANCE

(75) Inventor: David L. McCubbrey, Ann Arbor, MI (US)

(73) Assignee: Pixel Velocity, Inc., Ann Arbor, MI (US)

( * ) Notice: Subject to any disclaimer, the term of this patent is extended or adjusted under 35 U.S.C. 154(b) by 953 days.

(21) Appl. No.: 12/035,395

(22) Filed: Feb. 21, 2008

(65) Prior Publication Data

US 2008/0211915 A1 Sep. 4, 2008

Related U.S. Application Data

(60) Provisional application No. 60/891,006, filed on Feb. 21, 2007.

(51) Int. Cl.
*H04N 7/18* (2006.01)
*G06K 9/62* (2006.01)

(52) U.S. Cl.
USPC .......................................... 348/159; 382/209

(58) Field of Classification Search
USPC ................... 382/209; 370/422; 348/169, 159; 375/354
See application file for complete search history.

(56) References Cited

U.S. PATENT DOCUMENTS

| | | | | |
|---|---|---|---|---|
| 5,307,168 A | * | 4/1994 | Tashiro | 348/64 |
| 5,452,239 A | | 9/1995 | Dai et al. | |
| 5,623,304 A | * | 4/1997 | Ota et al. | 348/143 |
| 5,841,439 A | | 11/1998 | Pose et al. | |
| 5,912,980 A | * | 6/1999 | Hunke | 382/103 |
| 6,006,276 A | | 12/1999 | Maccormack et al. | |
| 6,064,398 A | | 5/2000 | Ellenby et al. | |
| 6,086,629 A | | 7/2000 | Mcgettigan et al. | |
| 6,097,429 A | | 8/2000 | Seeley et al. | |
| 6,202,164 B1 | | 3/2001 | Gulick | |
| 6,301,695 B1 | | 10/2001 | Burnham et al. | |
| 6,370,677 B1 | | 4/2002 | Carruthers et al. | |
| 6,373,851 B1 | | 4/2002 | Dadario | |
| 6,396,535 B1 | * | 5/2002 | Waters | 348/159 |
| 6,438,737 B1 | | 8/2002 | Morelli et al. | |
| 6,457,164 B1 | | 9/2002 | Hwang et al. | |
| 6,526,563 B1 | | 2/2003 | Baxter | |
| 6,557,156 B1 | | 4/2003 | Guccione | |

(Continued)

FOREIGN PATENT DOCUMENTS

| | | |
|---|---|---|
| WO | 03041411 A | 5/2003 |
| WO | 2007095526 A | 8/2007 |
| WO | 2008103850 A | 8/2008 |
| WO | 2011060385 A | 5/2011 |

OTHER PUBLICATIONS

PC/104 Specification Version 2.5 Nov. 2003.
PC/104-Plus Specification Version 2.0 Nov. 2003.

*Primary Examiner* — Firmin Backer
*Assistant Examiner* — Michael A Chambers
(74) *Attorney, Agent, or Firm* — Jeffrey Schox

(57) ABSTRACT

According to one embodiment, a controller for a surveillance system includes ports for coupling a camera, synchronization logic blocks coupled to the ports, an information aggregation logic block coupled to the camera ports, and an output port coupled to the information aggregation logic block. According to another embodiment, a method of scaling a surveillance system includes synchronizing a plurality of cameras, capturing images from the synchronized cameras, aggregating at least two processed synchronized images, and processing the aggregated synchronized images.

23 Claims, 13 Drawing Sheets

Object Tracking Across Multiple Cameras

(56) References Cited

U.S. PATENT DOCUMENTS

| | | | |
|---|---|---|---|
| 6,561,600 B1 | 5/2003 | Seeley et al. | |
| 6,625,743 B1* | 9/2003 | Gulick | 713/400 |
| 6,668,312 B2 | 12/2003 | Aubury | |
| 6,754,882 B1 | 6/2004 | Sanchez et al. | |
| 6,757,304 B1* | 6/2004 | Nomura et al. | 370/516 |
| 6,760,063 B1 | 7/2004 | Kamei | |
| 6,785,352 B1* | 8/2004 | Ranta | 375/354 |
| 6,798,344 B2* | 9/2004 | Faulkner et al. | 340/541 |
| 6,894,809 B2* | 5/2005 | Nims et al. | 358/1.9 |
| 6,970,183 B1 | 11/2005 | Monroe | |
| 6,985,620 B2* | 1/2006 | Sawhney et al. | 382/154 |
| 7,015,954 B1* | 3/2006 | Foote et al. | 348/218.1 |
| 7,054,491 B2* | 5/2006 | McGuinness et al. | 382/209 |
| 7,072,504 B2* | 7/2006 | Miyano et al. | 382/154 |
| 7,073,158 B2 | 7/2006 | Mccubbrey | |
| 7,106,374 B1 | 9/2006 | Bandera et al. | |
| 7,215,364 B2* | 5/2007 | Wachtel et al. | 348/218.1 |
| 7,231,065 B2 | 6/2007 | Peach et al. | |
| 7,386,833 B2 | 6/2008 | Granny et al. | |
| 7,394,916 B2 | 7/2008 | Brodsky et al. | |
| 7,451,410 B2 | 11/2008 | Mccubbrey | |
| 7,511,764 B2* | 3/2009 | Cooper et al. | 348/516 |
| 7,551,203 B2 | 6/2009 | Nakayama et al. | |
| 7,587,699 B2 | 9/2009 | Mccubbrey | |
| 7,620,266 B2 | 11/2009 | Brown et al. | |
| 7,750,926 B2* | 7/2010 | Lonsing | 345/633 |
| 7,817,207 B2* | 10/2010 | Sung | 348/464 |
| 8,063,929 B2 | 11/2011 | Kurtz et al. | |
| 2001/0046316 A1* | 11/2001 | Miyano et al. | 382/154 |
| 2003/0025599 A1* | 2/2003 | Monroe | 340/531 |
| 2003/0052966 A1* | 3/2003 | Trinkel et al. | 348/47 |
| 2003/0062997 A1 | 4/2003 | Naidoo et al. | |
| 2003/0086300 A1 | 5/2003 | Noyes et al. | |
| 2003/0095711 A1* | 5/2003 | McGuinness et al. | 382/209 |
| 2003/0098913 A1* | 5/2003 | Chang | 348/211.13 |
| 2003/0101426 A1 | 5/2003 | Sarkinen et al. | |
| 2003/0160980 A1 | 8/2003 | Olsson et al. | |
| 2003/0174203 A1* | 9/2003 | Takeno et al. | 348/47 |
| 2003/0193577 A1* | 10/2003 | Doring et al. | 348/211.99 |
| 2003/0217364 A1 | 11/2003 | Polanek et al. | |
| 2004/0061774 A1* | 4/2004 | Wachtel et al. | 348/36 |
| 2004/0061780 A1* | 4/2004 | Huffman | 348/148 |
| 2004/0095374 A1 | 5/2004 | Jojic et al. | |
| 2004/0130620 A1* | 7/2004 | Buehler et al. | 348/143 |
| 2004/0135885 A1 | 7/2004 | Hage | |
| 2004/0233983 A1* | 11/2004 | Crawford et al. | 375/240.01 |
| 2004/0240542 A1* | 12/2004 | Yeredor et al. | 375/240.01 |
| 2004/0252193 A1* | 12/2004 | Higgins | 348/149 |
| 2004/0252194 A1* | 12/2004 | Lin | 348/169 |
| 2004/0263621 A1* | 12/2004 | Guo et al. | 348/143 |
| 2005/0025313 A1* | 2/2005 | Wachtel et al. | 380/54 |
| 2005/0047646 A1 | 3/2005 | Jojic et al. | |
| 2005/0073585 A1* | 4/2005 | Ettinger et al. | 348/155 |
| 2005/0073685 A1* | 4/2005 | Arai | 356/419 |
| 2005/0165995 A1 | 7/2005 | Gemelli et al. | |
| 2005/0185053 A1* | 8/2005 | Berkey et al. | 348/155 |
| 2005/0190263 A1* | 9/2005 | Monroe et al. | 348/159 |
| 2005/0212918 A1* | 9/2005 | Serra et al. | 348/208.14 |
| 2005/0275721 A1* | 12/2005 | Ishii | 348/159 |
| 2006/0007242 A1 | 1/2006 | Hill et al. | |
| 2006/0020990 A1 | 1/2006 | Mceneaney | |
| 2006/0028552 A1* | 2/2006 | Aggarwal et al. | 348/169 |
| 2006/0117356 A1 | 6/2006 | Jojic et al. | |
| 2006/0149829 A1* | 7/2006 | Kuan | 709/217 |
| 2006/0171453 A1* | 8/2006 | Rohlfing et al. | 375/240.01 |
| 2006/0174302 A1* | 8/2006 | Mattern et al. | 725/105 |
| 2006/0187305 A1* | 8/2006 | Trivedi et al. | 348/169 |
| 2006/0197839 A1* | 9/2006 | Senior et al. | 348/169 |
| 2006/0215765 A1 | 9/2006 | Hwang et al. | |
| 2006/0227138 A1 | 10/2006 | Oizumi | |
| 2006/0252521 A1* | 11/2006 | Gururajan et al. | 463/29 |
| 2006/0252554 A1* | 11/2006 | Gururajan et al. | 463/47 |
| 2007/0024635 A1 | 2/2007 | Jojic et al. | |
| 2007/0024706 A1 | 2/2007 | Brannon et al. | |
| 2007/0058717 A1 | 3/2007 | Chosak et al. | |
| 2007/0065002 A1 | 3/2007 | Marzell et al. | |
| 2007/0098001 A1* | 5/2007 | Thomas | 370/422 |
| 2007/0104328 A1* | 5/2007 | Sung | 380/221 |
| 2007/0104383 A1 | 5/2007 | Jojic et al. | |
| 2007/0183770 A1 | 8/2007 | Aoki et al. | |
| 2007/0247525 A1 | 10/2007 | Samarasekera et al. | |
| 2007/0250898 A1 | 10/2007 | Scanlon et al. | |
| 2007/0258009 A1 | 11/2007 | Kanda et al. | |
| 2007/0279494 A1* | 12/2007 | Aman et al. | 348/169 |
| 2008/0019566 A1 | 1/2008 | Niem et al. | |
| 2008/0036864 A1* | 2/2008 | McCubbrey et al. | 348/159 |
| 2008/0060034 A1 | 3/2008 | Egnal et al. | |
| 2008/0074494 A1 | 3/2008 | Nemethy et al. | |
| 2008/0096372 A1* | 4/2008 | Demand et al. | 438/585 |
| 2008/0133767 A1 | 6/2008 | Birrer et al. | |
| 2008/0148227 A1 | 6/2008 | Mccubbrey | |
| 2008/0151049 A1* | 6/2008 | McCubbrey et al. | 348/143 |
| 2008/0211915 A1* | 9/2008 | McCubbrey | 348/159 |
| 2008/0297587 A1 | 12/2008 | Kurtz et al. | |
| 2009/0051682 A1* | 2/2009 | Lonsing | 345/419 |
| 2009/0086023 A1* | 4/2009 | McCubbrey | 348/143 |
| 2011/0115909 A1 | 5/2011 | Sternberg et al. | |

* cited by examiner

SCALABLE SYSTEM FOR WIDE AREA SURVEILLANCE

CROSS-REFERENCE TO RELATED APPLICATIONS

This application claims the benefit of U.S. Provisional Application No. 60/891,006, filed 21 Feb. 2007, which is incorporated in its entirety by this reference.

TECHNICAL FIELD

This invention relates generally to the surveillance field, and more specifically to a scalable system and method for wide area surveillance.

BACKGROUND

Synchronizing cameras includes obtaining a desired fixed relationship among corresponding significant instants of two or more sensor data streams. The ability to synchronize remote cameras is important when implementing one or more of the following features of a surveillance system: (1) properly collect, fuse, analyze, and interpret sensor data of a target object within a similar view from different sensors, (2) properly collect, align, analyze, and interpret sensor data of a target object across adjacent views of different sensors, (3) quickly adjust or modify the collection of the sensor data based on the analysis and interpretation of adjacent sensor data or other data, and (4) properly interpret sensor data based on a "big picture" perspective of the site.

Ethernet, which is a standard networking protocol used in local area networks, provides a low-cost method of communicating digital image data from remote cameras. The ability to synchronize the remote cameras over an Ethernet connection, however, is very challenging based on the latencies that depend on the network load, which is variable and unpredictable. Unlike Ethernet, the IEEE 1394 standard for a high performance serial bus allows tight synchronization of digital cameras belonging to the same bus. The IEEE 1394 technique has, however, the drawback that cameras belonging to the same bus each must share the total bus bandwidth, so that the technique fails to scale to systems containing more than 2 or 3 cameras.

Analog cameras have a concept of "genlock" that allows cameras to be synchronized to a common timing source. The drawback to this approach is that it requires an extra cable to be run between all cameras. This is impractical in systems employing widely distributed cameras, due to installation and cabling costs. Distributed surveillance systems typically aggregate information using a network of PCs. But networked surveillance information introduces unavoidable and uncertain delays due to network routing and latency. This is a significant drawback in situations requiring low latency, such as object tracking. In addition, aggregation of processed results using a network also introduces latency.

Thus, there is a need in the surveillance field to create a scalable method and system for wide area surveillance that achieves tight synchronization between a large number of remote cameras, and achieves very scalable high speed and low latency processing at multiple information aggregation levels. This invention provides such new and useful scalable method and system.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The invention preferably includes many tightly synchronized acquisition nodes that feed to one or more aggregation nodes through isochronous communication links. In the preferred embodiment both the acquisition nodes and information aggregation nodes preferably contain processing intelligence to optimally distribute the computational loading. This model is highly scalable in both acquisition nodes and layers of aggregation nodes. In particular, the combination of low latency, tight synchronization, and distributed computation provided by the model enables many important wide-area surveillance applications, including distributed tracking of moving objects across many views, fusing different image modalities such as visible and InfraRed into products that deliver better information, high dynamic range imaging, adaptive behavior, and 3D imaging of moving objects using multi-look feature correspondence.

Figure 1:
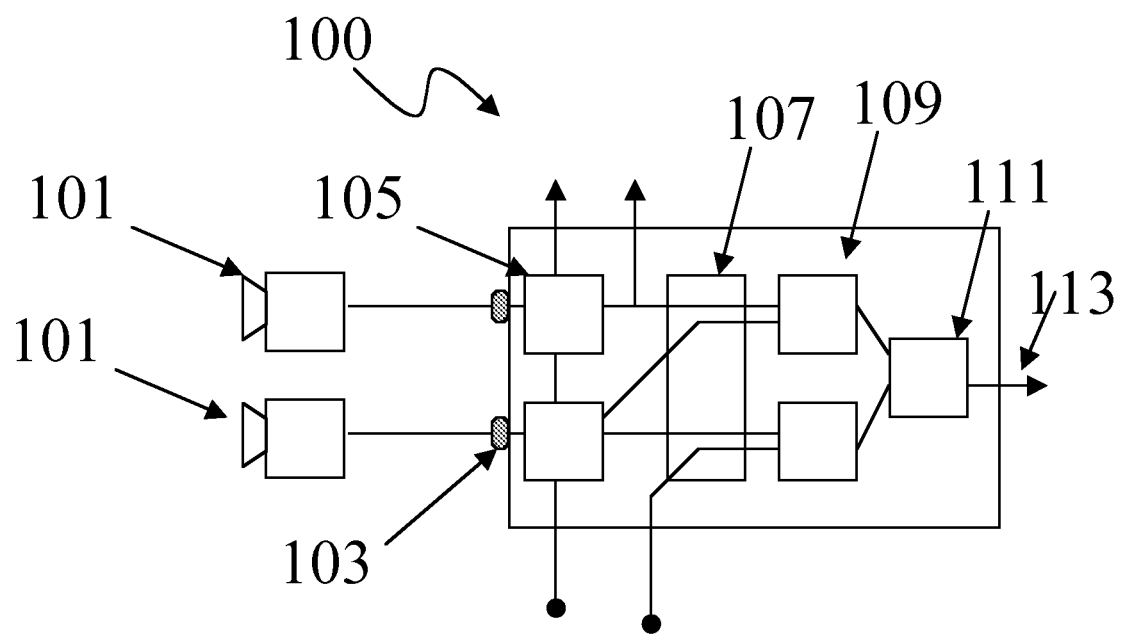
FIG. 1 is a schematic representation of a controller of the preferred embodiment of the invention.
Figure 2:
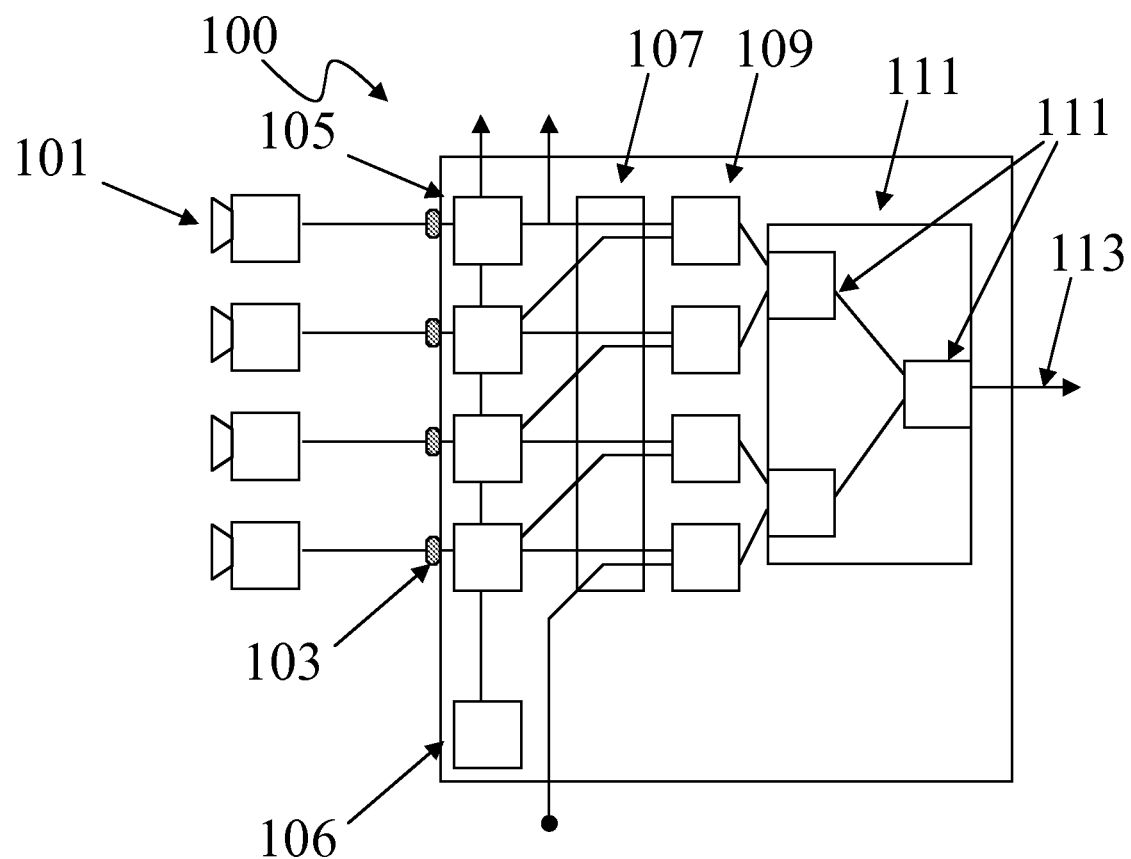
FIG. 2 is a schematic representation of a controller of a variation including a synchronization controller of the preferred embodiment of the invention.
Figure 3:
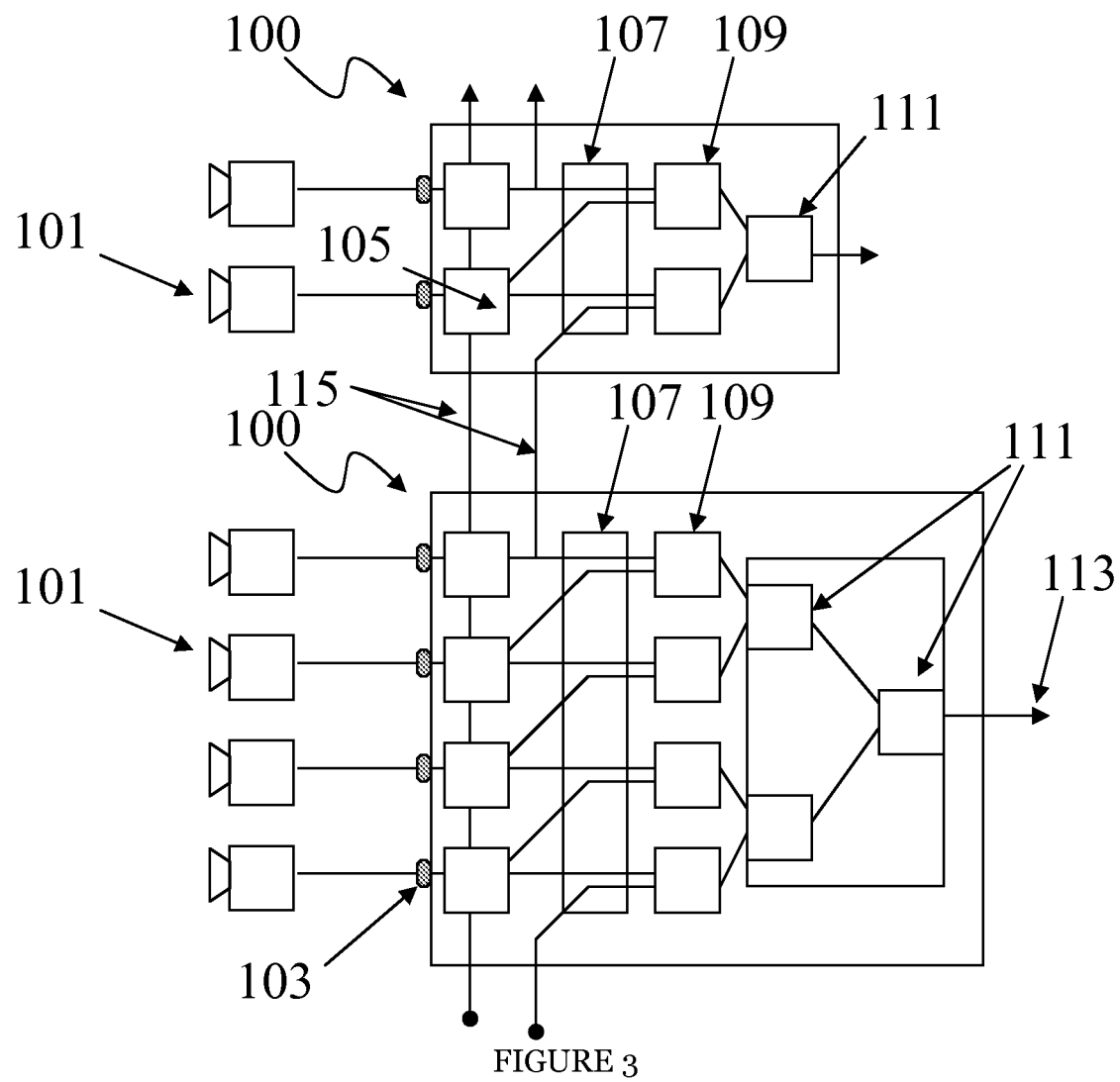
FIG. 3 is a schematic representation of coupled controllers of the preferred embodiment of the invention.
Figure 4:
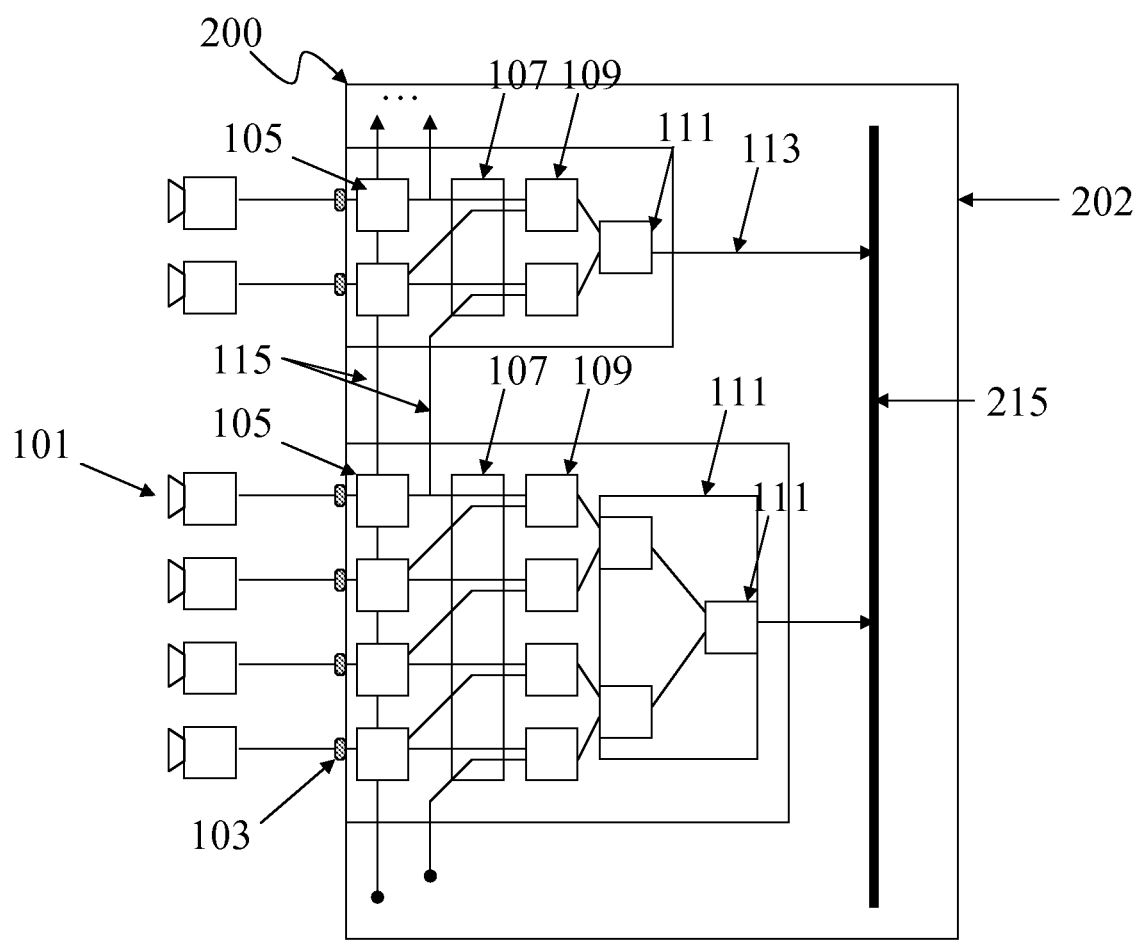
FIG. 4 is a schematic representation of a system of the preferred embodiment of the invention.
Figure 5:
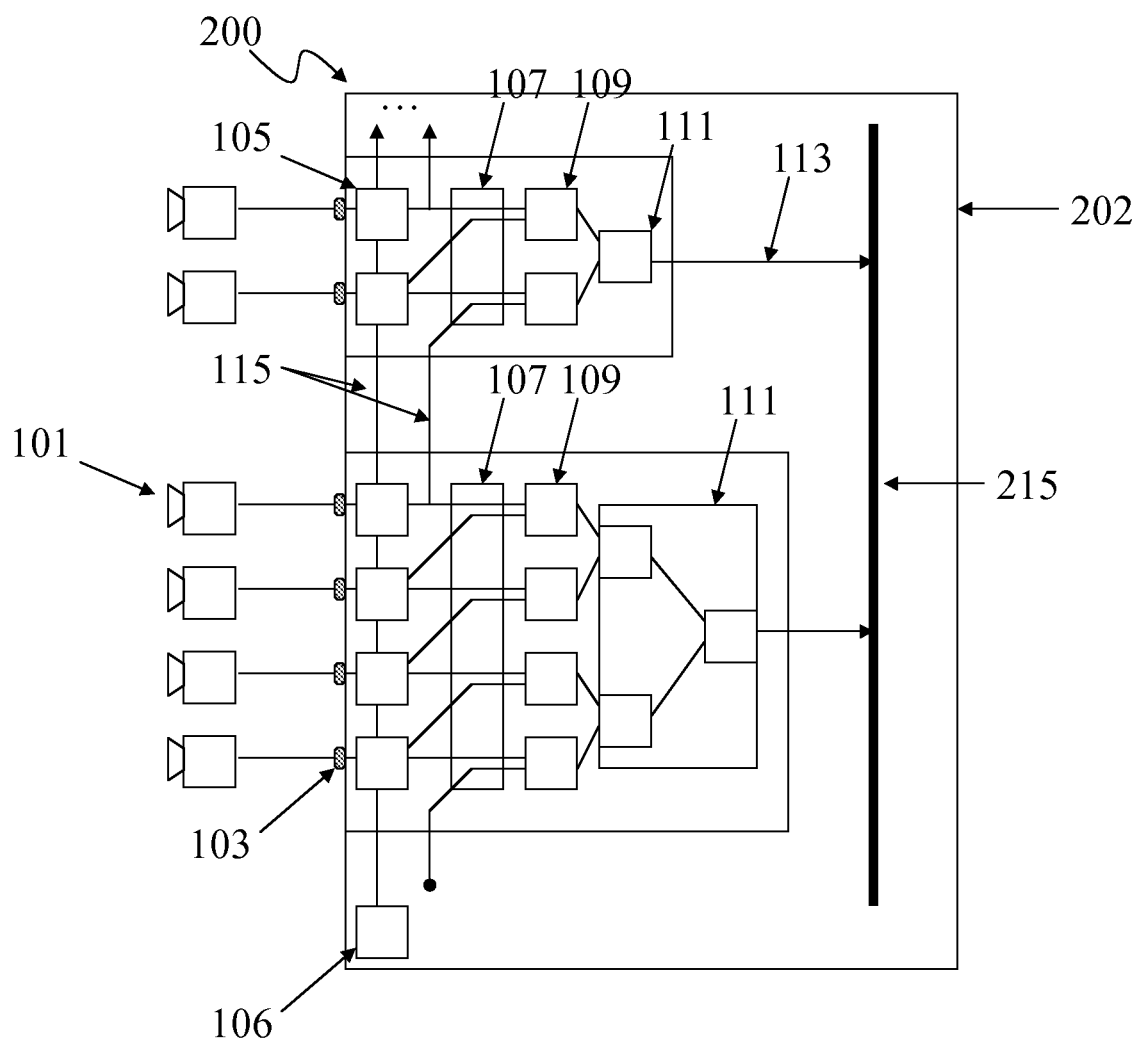
FIG. 5 is a schematic representation of a system of the preferred embodiment of the invention including a synchronization controller.
Figure 6:
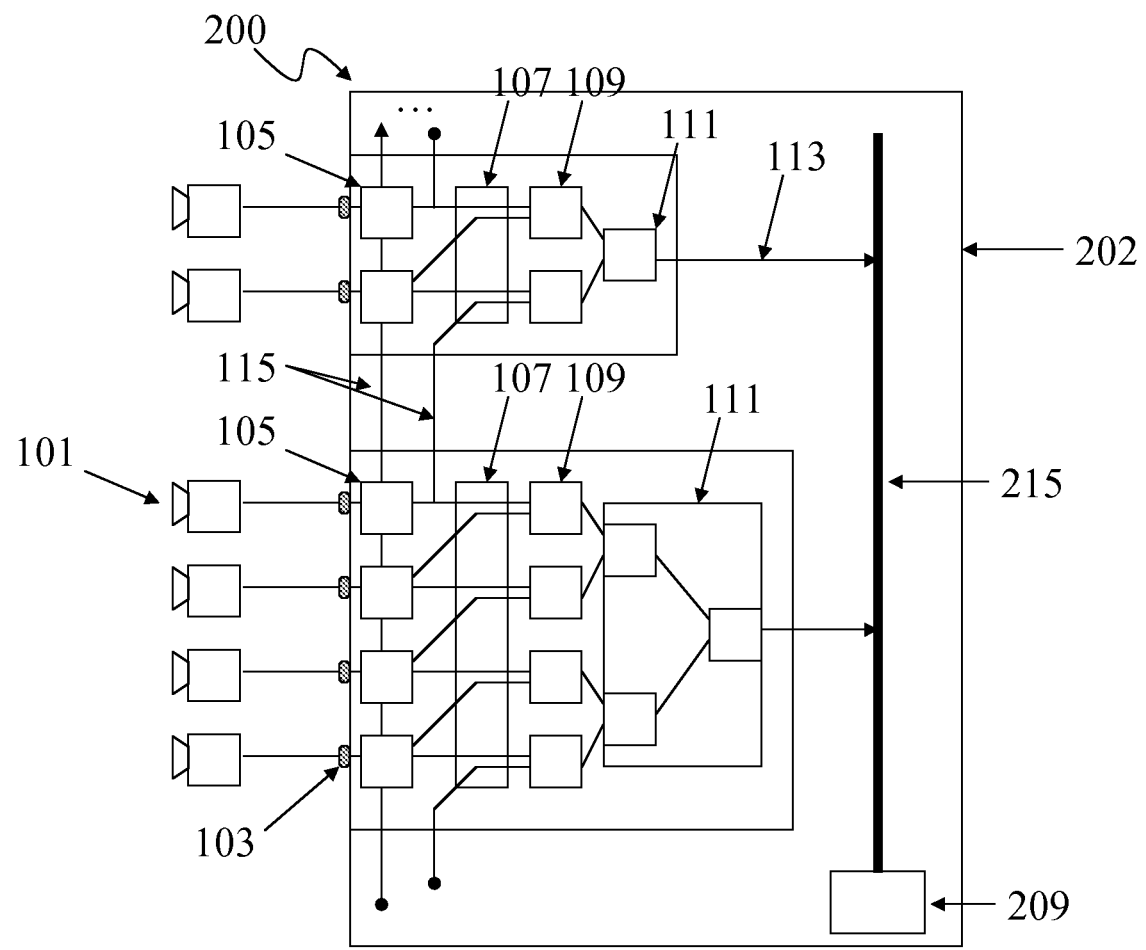
FIG. 6 is a schematic representation of a system of the preferred embodiment of the invention including a processor.
Figure 7:
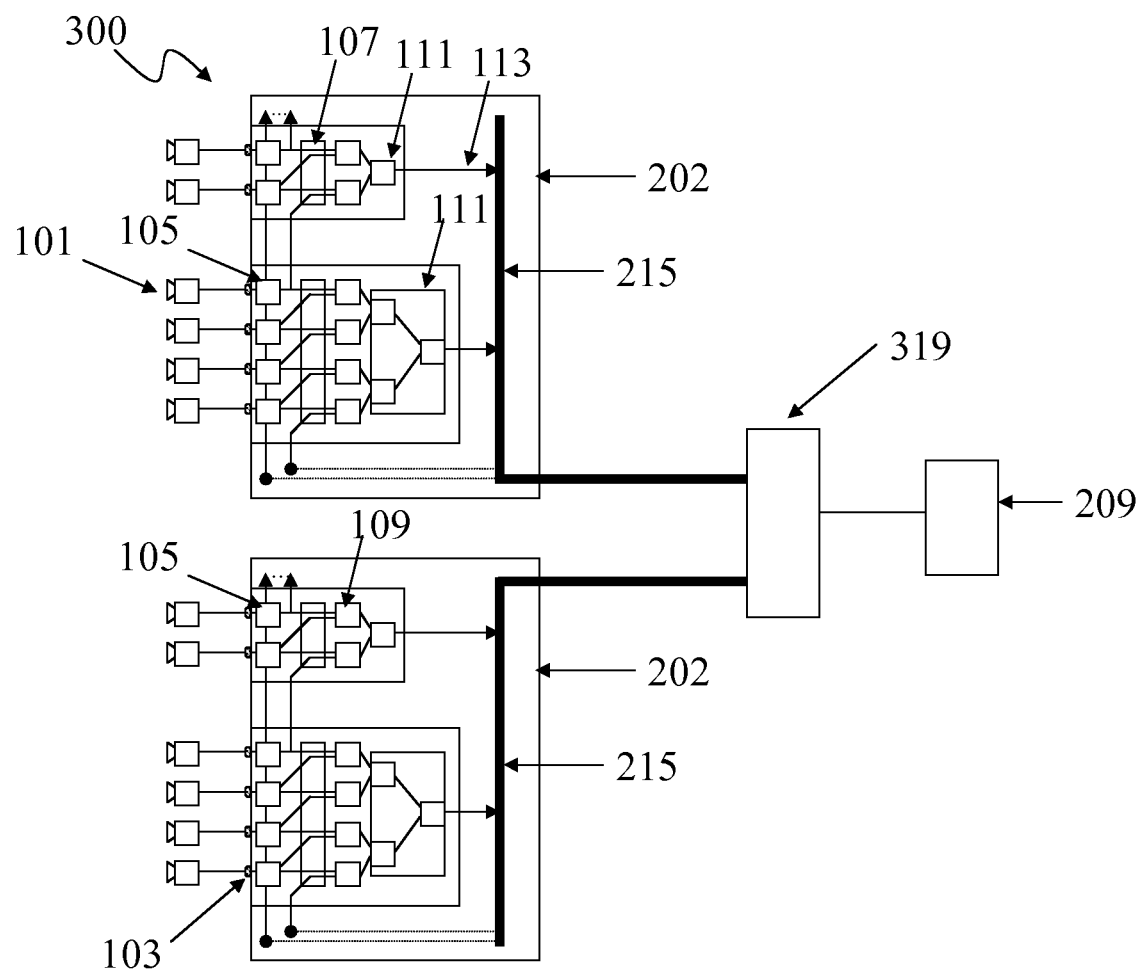
FIG. 7 is a schematic representation of a network of systems of the preferred embodiment of the invention including a low latency switch.
Figure 8:
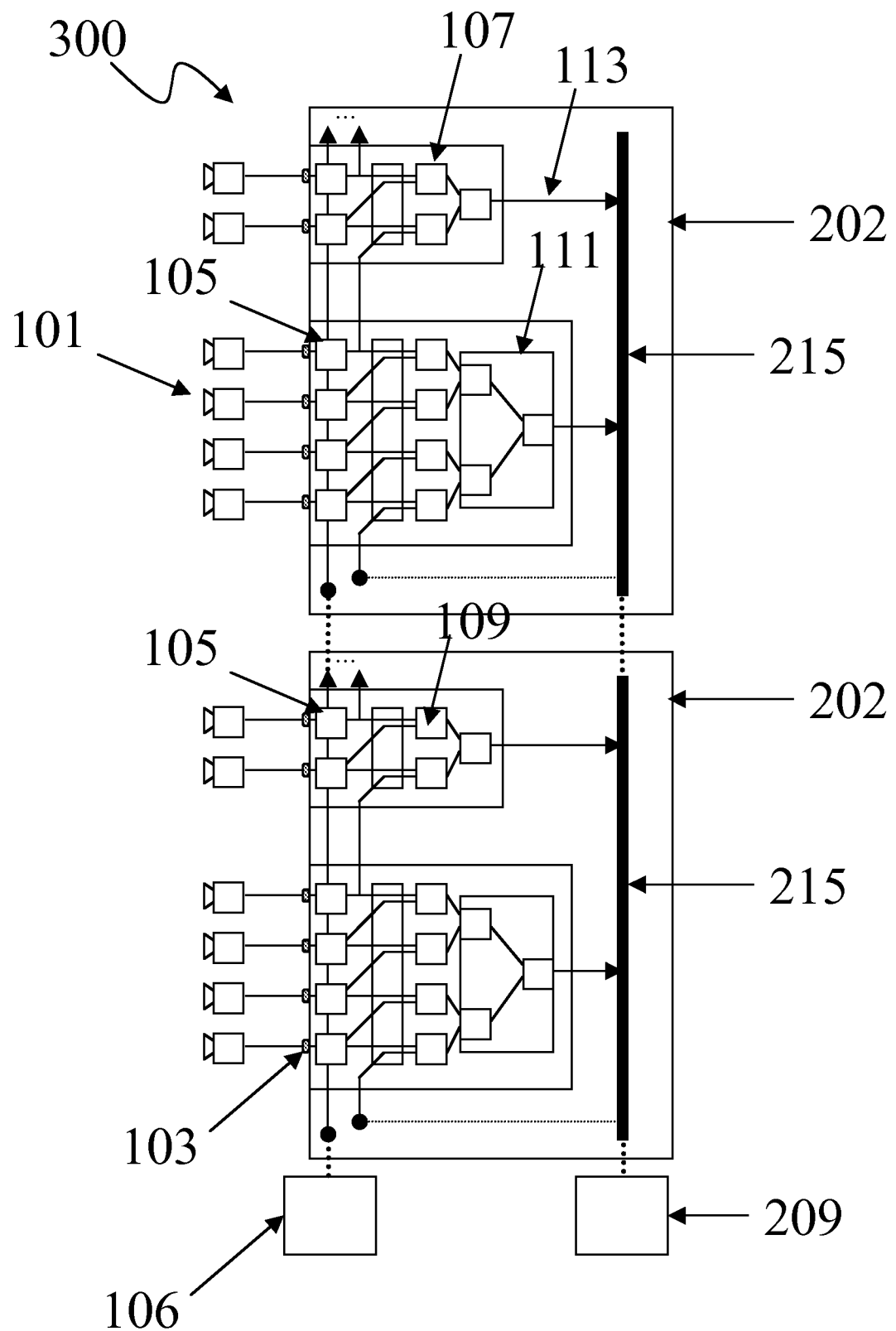
FIG. 8 is a schematic representation of a network of systems of the preferred embodiment of the invention, including a global synchronization controller.
Figure 9:
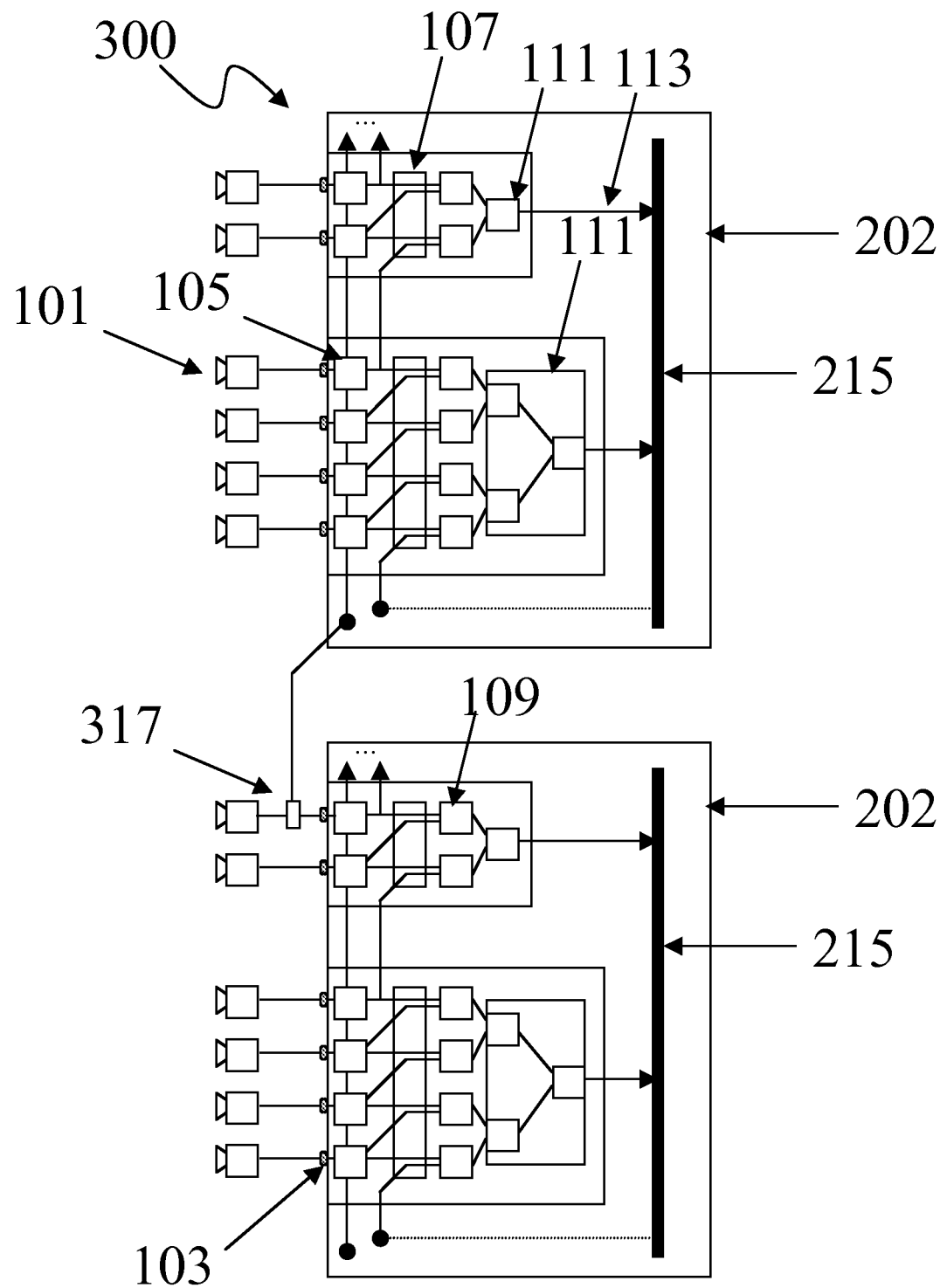
FIG. 9 is a schematic representation of a network of systems of the preferred embodiment of the invention, including a split feed bus connection between systems.

In the preferred embodiment, the invention preferably includes a method and system for collecting information from many remote imagers or sensors, more preferably cameras, that aggregate and process information in real-time to infer events in the environment. A scalable controller is shown in FIGS. 1-3, a scalable chassis based subsystem is shown in FIGS. 4-6, and a scalable low latency multi-chassis system is shown in FIGS. 7-9. Arrangements and applications of the invention are shown in FIGS. 10-14. A method of capturing surveillance images is shown in FIG. 15.

As shown in FIGS. 1-3, a controller 100 for a surveillance system includes ports 103 for coupling to a camera 101, synchronization logic blocks 105 coupled to the ports 103, an information aggregation logic block 111 coupled to the camera ports 103, and an output port 113 coupled to the information aggregation logic block 111. The preferred embodiment further includes an image sharing logic block 107 coupled to the synchronization logic block 105 of at least two ports 103, and an image pair-processing logic block 109 coupled to the image sharing logic block 107.

The ports 103 function to connect the controller 100 to a camera 101. The camera port 103 is preferably a standard IEEE 1394 over CAT-5 port, but may alternatively be a standard Firewire (IEEE 1394b) port, a Serial ATA port, a USB port, an IEEE 1394b over coax connector, or any other suitable port for a connection for a camera 101 to the controller 100. The output port 113 is preferably a PCI Express port, but may alternatively be an IEEE 1394 port or any other suitable port.

The information aggregation logic block 111 preferably functions to aggregate the data analysis from all of the cameras 101, and transmit the consolidated results to an information bus, or to main memory for a processor 209 for further processing on the synchronized information. The information aggregation logic block 111 is preferably implemented in a Field Programmable gate array, but may alternatively be an ASIC or any other suitable device.

The synchronization logic blocks 105 function to synchronize the cameras 101 connected to the controller 100. The synchronization logic block 105 maintains consistency of the CYCLE_TIME register of the camera 101 to prevent drift over time. This may be accomplished by periodic update of the CYCLE_TIME value, for which the synchronization logic blocks 105 preferably receive a synchronization signal from a synchronization controller 106. The synchronization logic blocks 105 are preferably implemented in a Field Programmable Gate Array (FPGA), but may alternatively be implemented in an Application Specific Integrated Circuit (ASIC), software on a microprocessor, or any other suitable device.

The synchronization controller 106 (also known as a timing monarch), functions to generate a synchronization signal. The synchronization controller 106 preferably generates a global time setting signal (also known as a synchronization signal) to ensure consistent values for the IEEE 1394 BUS_TIME and CYCLE_TIME registers of a camera 101 as it is capturing images, such that the image capture and/or subsequent transfer between multiple cameras 101 is synchronized. The synchronization signal preferably establishes a common and consistent value for BUS_TIME and CYCLE_TIME across all connected devices with a timing uncertainty less than half that of the CYCLE_TIME interval. The synchronization controller 106 preferably generates an isochronous frequency signal as the synchronization signal to mark timing cycle starts and periodically re-synchronizes additional controllers 100 or systems 200 that may be connected to the synchronization controller 106, more preferably the frequency signal is an 8 kHz signal (the CYCLE_TIME in this case is 125 microseconds). Multicast is required for proper coordination of global timing if the cameras 101 are not cross connected (cross connected cameras are shown in FIGS. 1-3). In addition to the common re-synchronizer, a global time setting service is provided to guarantee consistent values for each channel's individual BUS_TIME and CYCLE_TIME registers.

In the preferred embodiment of the invention, as shown in FIGS. 1-3, the controller 100 also includes an image sharing logic block 107 and an image pair-processing logic block 109. These additional logic blocks preferably provide the controller 100 with dedicated reconfigurable hardware resources for per-image-stream and image-to-image stream processing functions.

The image sharing logic block 107 preferably accepts images from at least two synchronized cameras 101 as inputs and preferably outputs the images to an image-pair-processing logic block 109, but may alternatively use any number of images from any number of cameras 101, and may connect to any number of image pair-processing logic blocks. An image stream from any channel may be processed on a per-channel and additionally on a channel pair basis, by proper routing of image streams and allocation of processing resources. A stream may be directed to more than one camera-pair processor. The image sharing logic block 107 is preferably implemented in a FPGA, but may alternatively be implemented in an ASIC, a multiplexer chip, or any other suitable implementation.

The image pair-processing logic block 109 preferably uses the routed images from the image sharing logic block 107 to perform image processing on pairs of images. Preferably, the images are captured with partially or fully overlapping fields of view, then the image pair-processing block 109 preferably combines the images, more preferably stitching and/or fusing images together, and/or generating super-resolution images from overlapping areas. In one variation, if a thermal image is captured from a camera 101, the image pair-processing logic block 109 may generate thermal heat signature verification images, preferably by overlaying a thermal image over an optical image. In another variation, the image pair-processing logic block 109 may track moving objects from one camera field of view to another and simply transmit local track coordinates to the information aggregation logic block 111. In yet another variation, the image pair-processing logic block 109 may combine overlapping images from different perspectives to generate a 3-dimensional image. The image pair-processing logic block 109 is preferably implemented in an FPGA, but may alternatively be an ASIC or any other suitable implementation.

As shown in FIGS. 4-6, a surveillance system 200 includes at least two controllers 100, a communication channel 215 connected to the controllers 100, and a chassis 202 supporting the controllers 100.

Except as noted below, the controllers 100 are preferably identical to the controllers 100 described above (and shown in FIGS. 1-3). The controllers 100 are preferably manufactured as a modular device, more preferably as controller cards, and still more preferably as PCI express cards, but may alternatively be any type of controller card, such as IEEE 1394, USB, Serial ATA, or any other suitable device. In one variation the controller provides a mechanism for sharing data streams between controllers 100, implemented as a high speed point-to-point link 115. Sharing data directly between controllers 100 preserves external PCIe bandwidth, and allows greater flexibility in processing of overlapping fields of view. Multiple controller cards 100 within the same chassis 202 preferably have local links 115 that provide card-to-card channel synchronization and image sharing. As shown in FIG. 5, one controller card 100 may be connected to a synchronization controller 106 that supplies the isochronous timer to all other controller cards 100 in that chassis 202 by means of a series of local card-card links 115. Each controller card 100 preferably supports connections for at least 4 cameras 101.

The communication channel 215 connected to the controllers 100 preferably functions to enable communication between the controllers 100. The communication channel 215 is preferably a PCI-Express bus, but may be an IEEE 1394 (Firewire), PCI, ISA, or any other suitable low-latency communication channel. The interface between the controllers 100 and the communication channel 215 is preferably a socketed connection, more preferably a socket that connects to a PCI-express bus, but any suitable connection may be used, including wireless or daisy chained communication channels. The communication channel 215 preferably supports up to 64 controllers 100. In one variation, the communication channel 215 may include a synchronization and/or image data channel. In another variation, the communication channel 215 may connect the controllers 100 to an additional system on a network.

The chassis 202 functions to support the controllers 100, and in the preferred embodiment, to support the communication channel 215. The chassis 202 also preferably functions to provide power to the controllers 100. The chassis 202 may be made of aluminum or steel, and preferably supports sixty-four controllers 100 in the form of controller cards, preferably connected to a PCI Express bus. The controllers 100 are preferably fastened to the chassis 202 by a fastener or by any other suitable device or method.

In one variation of the preferred embodiment, as shown in FIG. 5, a synchronization controller 106 (as previously described) may be connected to the synchronization channel of at least one controller 100 in the system 200. The synchronization controller 106 preferably uses a protocol built upon an isochronous long-distance interconnect (such as IEEE 1394) by adding a global timing service to keep separate bus trees synchronized within a single chassis 202. Unlike conventional IEEE 1394, two additional synchronization services are preferably added to ensure consistent local timekeeping for every camera time domain. This is preferably accomplished by designating a single "Timing Monarch"/synchronization channel to provide a continuous source for 8 kHz isochronous cycle starts. The common 8 kHz signal preferably serves to periodically re-synchronize each independent channel connected to a single chassis 202.

In another variation of the preferred embodiment, as shown in FIG. 6, a processor 209 is connected to the communication channel 215, and preferably performs processing functions on the data received from each controller 100. In this variation, the controllers 100 preferably forward images or analytic results (or both) to main memory for further processing by a microprocessor 209. Alternatively, results or images may be forwarded to specialized aggregation processors residing elsewhere on the PCIe bus. This technique provides high bandwidth, low latency cost effective analysis and aggregation of image channels and analysis results within a single chassis 202.

Figure 10:
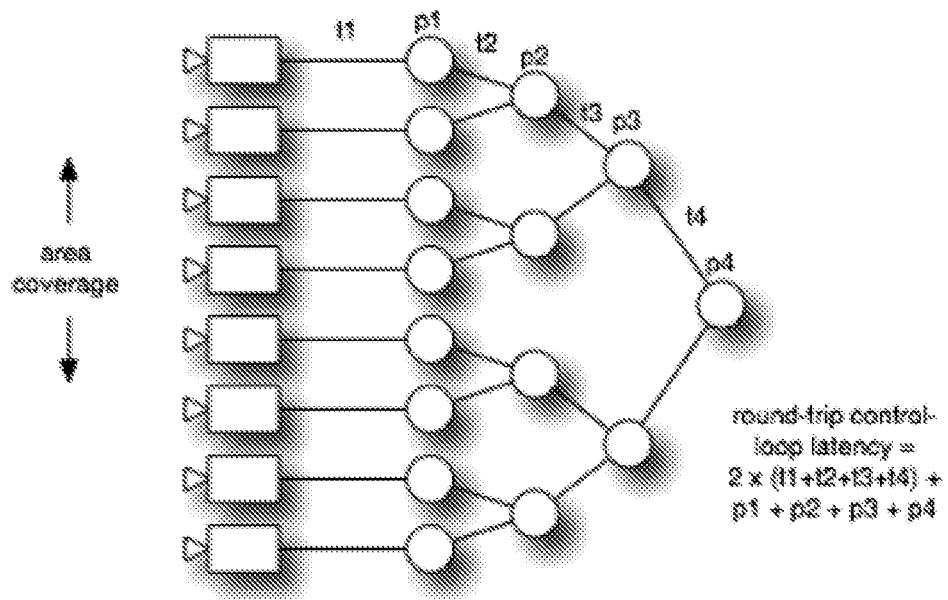
FIG. 10 is a schematic representation of the lag times in a sensor information aggregation network.

As shown in FIGS. 7-10, a larger scale system 300 is preferably constructed by connecting multiple (possibly remote) individual systems 200 together. As shown in FIGS. 7-10, a large scale system 300 for surveillance includes at least two systems 200 and a communication channel 215 connecting the systems 200. A low latency multi-chassis system 300 using star topology using a low latency switch 319 to connect systems 200 is shown in FIG. 7, and a serial network topology using a processor 209 and/or a synchronization controller 106 is shown in FIG. 8. A variation of connecting systems 200 using a shared camera bus 317 is shown in FIG. 9. An aggregation timing diagram is shown in FIG. 10.

The systems 200 are preferably identical to the systems 200 described above (and shown in FIGS. 4-6). The communication channel 215 is preferably a PCI Express bus, but may alternatively be IEEE 1394, or any other suitable communication channel.

In one variation a low latency switch 319 is used to bridge multiple systems 200 together, more preferably bridging PCI express based fan-in tree systems 200. The low latency switch 319 preferably uses low latency techniques, such as those employed by a PCI express bus switch or Infiniband. These interconnect technologies provide the necessary performance for low latency information aggregation. Multicast is ideally used for proper coordination of global timing if systems 200 are not cross connected (cross connected variants are shown in FIGS. 8-9). The basic requirement for multi-chassis synchronization is to be able to establish a common and consistent value for IEEE 1394 BUS_TIME and CYCLE_TIME across all systems 200, preferably with a timing uncertainty less that half that of the CYCLE_TIME interval (125 microseconds in the preferred embodiment, which uses an 8 kHz synchronization signal). For instance, Infiniband, with a switch latency of only 2.25 microseconds and capability for broadcast transactions can easily meet this requirement. PCI express, without broadcast, must enforce sequential system synchronization activity within a critical time interval.

In one variation, as shown in FIG. 8, a large scale system 300 includes a processor 209. The processor 209 preferably functions to process data received from the systems 200 in the network. In another variation, also shown in FIG. 8, the network of systems 300 includes a synchronization controller 106. The processor 209 may also function as a synchronization controller 106.

In one variation, as shown in FIG. 9, the communication channel that connects the systems 200 may be at least one split camera feed 317, providing both time synchronization and image sharing between multiple chassis systems 200 (if geographically separated). This synchronization and/or data channel preferably forms a three-node isochronous bus. The third node may be connected to a remote chassis 202 and may propagate CYCLE_TIME and BUS_TIME to the remote system 200 using appropriate broadcast commands, such as IEEE 1394 CYCLE_START commands. In the remote system 200, the channel receiving BUS_TIME and CYCLE_TIME information is designated a secondary timing monarch (or a synchronization controller repeater) for the remote system 200. In this variant, the synchronization channel preferably synchronizes all other channels in the system contained within the chassis 202 (and any additional systems 200 that may be connected).

As shown in FIG. 10, the general situation for a system encompassing many cameras includes processing nodes (indicated by circles) that perform some amount of analysis before forwarding the results to a higher level in the tree. A conventional implementation of such an architecture would be to allocate a PC to each processing node and link them using an Ethernet TCP/IP network. This approach is capable of scaling and supporting a large number of cameras, but it provides poor efficiency and poor latency. Typical network packet latencies are on the order of 1 millisecond on a local network without intervening routers. Moreover, support for this communication consumes a significant amount of CPU overhead at each of the processing nodes. The network illustrated in FIG. 10 would have a round-trip latency of 8 milliseconds under the conditions of a typical implementation. In contrast, the method and system of the preferred embodiment preferably uses a processing and communication architecture based on a low cost commodity bus such as PCI Express (PCIe). PCIe achieves node-node latencies under 10 microseconds worst case, making total communication latency lower by a factor of at least 100. In addition, since the PCIe communication protocol is handled primarily in hardware, communication overhead is considerably reduced as well.

The cameras are preferably digital video cameras, but may alternatively be still image cameras, thermal cameras, night vision cameras, audio and visual sensors (such as a camera or a microphone), tracking sensors (such as a thermal sensor, a pressure sensor, a RFID detector, or a motion detector), and ambient sensors (such as a rain sensor, a carbon monoxide sensor, a dust sensor, a water or water level sensor, a humidity sensor, a temperature sensor, a light sensor, a methane sensor, a smoke detector, or a wind sensor), or any other suitable cameras or sensors.

Figure 11:
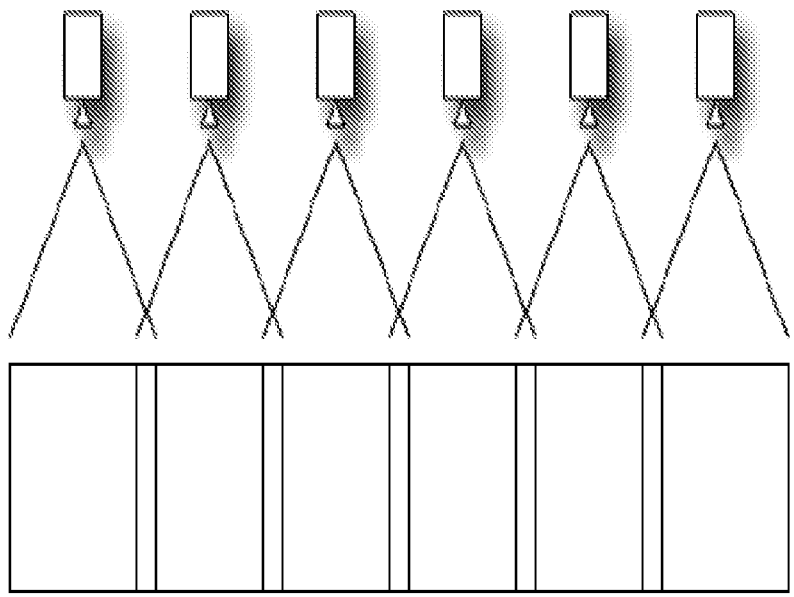
FIG. 11 is a schematic representation of an arrangement of sensors with overlapping fields of view.
Figure 12:
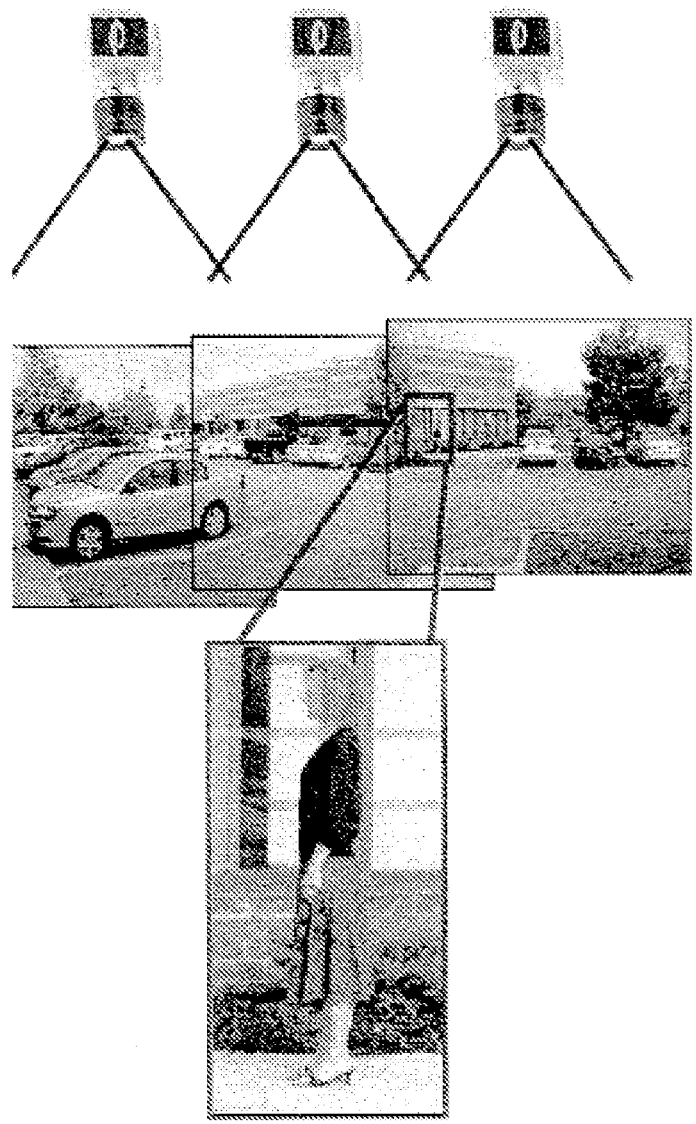
FIG. 12 is a representation of the application of object tracking across multiple cameras.
Figure 13:
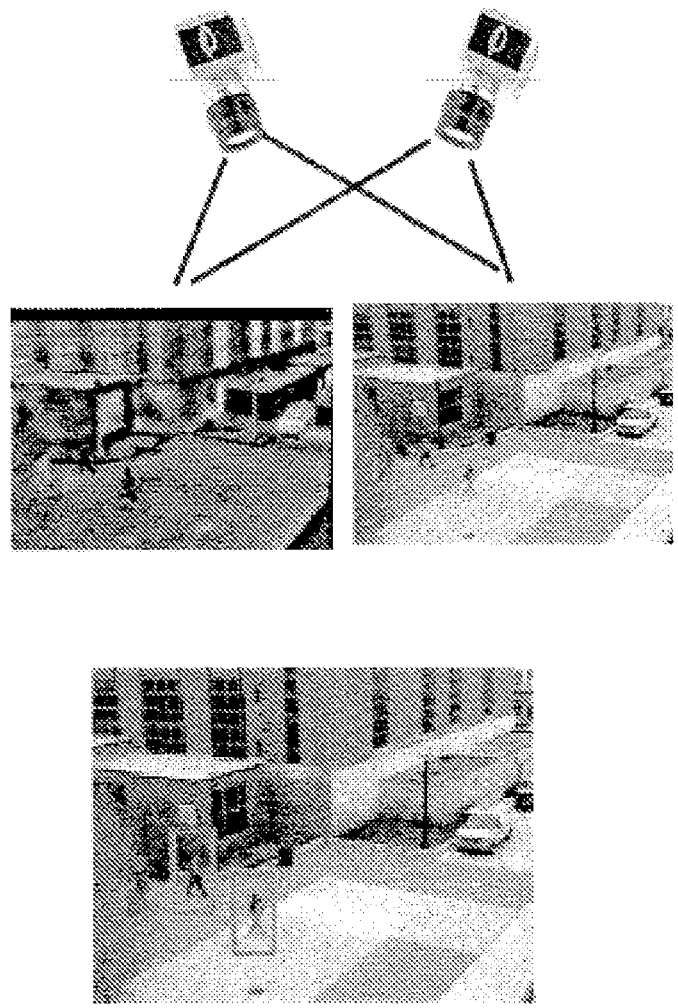
FIG. 13 is a representation of the application of thermal verification with visible imaging.
Figure 14:
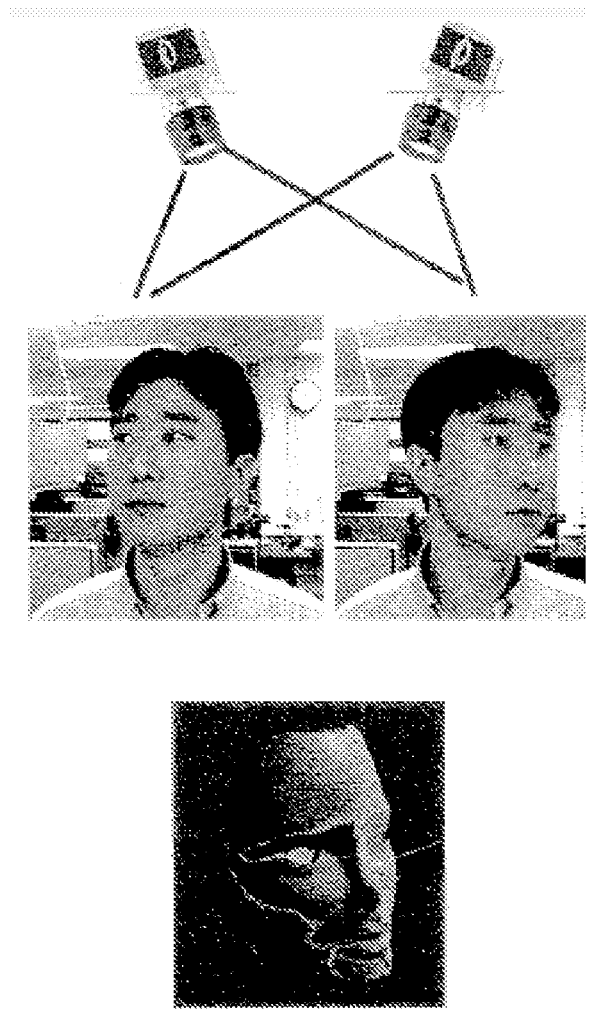
FIG. 14 is a representation of the application of 3-dimensional face matching.
Figure 15:
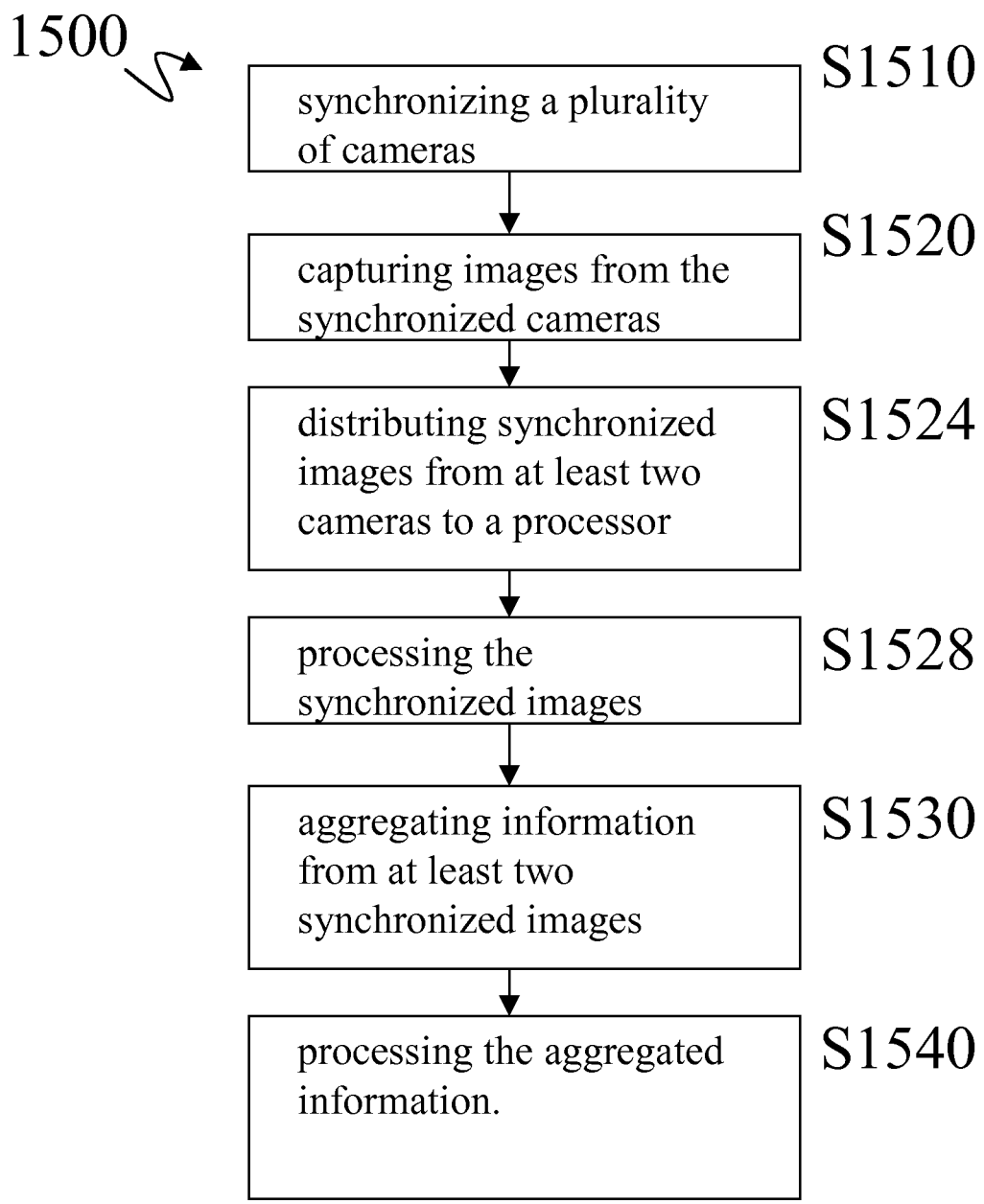
FIG. 15 is a flowchart representation of the preferred method of the invention.

As shown in FIGS. 11-14, the sensor arrangement of the preferred embodiment can be varied based on the intended use of the method and system. As shown in FIG. 11, the cameras are preferably positioned with overlapping fields of view, but may be positioned to capture stereo images, to capture an optical and an infrared image, or any other suitable positioning that may be useful for an imaging application. In a first variation, as shown in FIG. 12, the method and system may be used to track an object across multiple cameras. In this variation, the images from the cameras are preferably stitched together to provide panoramic views. In a second variation, as shown in FIG. 13, the method and system may be used to rapidly identify and track an object. In this variation, an image from a camera is fused with an output from a thermal sensor. In this variation, the image and the output are preferably focused or pointed in the same general direction. In a third variation, as shown in FIG. 14, the method and system may be used to generate a 3-D face model. In this variation, a camera pair is preferably focused or pointed toward the same general area from two different angles. In a fourth variation (not shown), the method and system may be used to generate a 3-D human model. In this variation, like the third variation, a camera pair is preferably focused or pointed toward the same general area from two different angles. Unlike the third variation, however, the cameras of the fourth variation are generally pointed downward toward the human objects. In a fifth variation (not shown) the method and system may be used to acquire high dynamic range images by acquiring synchronized and closely aligned views of the same scene, but with different individual camera integration times.

As shown in FIG. 15, a method of the preferred embodiment 1500 includes synchronizing a plurality of cameras S1510, capturing images from the synchronized cameras S1520, aggregating information from at least two synchronized images S1530, and processing the aggregated information S1540. As shown in FIG. 15, the method of the preferred embodiment also includes the steps of distributing synchronized images from at least two cameras to a processor S1524, and processing the synchronized images S1528.

Step S1510, which recites synchronizing a plurality of cameras, functions to send a synchronization signal to two or more cameras to enable synchronized image capture. The synchronization signal is described above.

Step S1520, which recites capturing images from the synchronized cameras, functions to capture images from the cameras in a time-coordinated fashion, which may be synchronized (such that all images are taken at the same time) or syncopated (such that images are taken at alternating times), or any other time coordinated image capture.

Step S1530, which recites aggregating information from at least two processed synchronized images, functions to consolidate the analysis and/or processed image data from the cameras and/or image processing step and transmit the data to a processor. The aggregation may be performed on a controller scale, a system scale or a wide area network (such as a large corporate network or the internet).

Step S1540, which recites processing the aggregated information, functions to perform processing using more information than step S1528, preferably image processing for security or surveillance functions, more preferably object tracking, image stitching, super-resolution, image fusion, heat signature verification, 3-d image processing, facial recognition, or any other suitable image processing application.

Step S1524, which recites distributing synchronized images from at least two cameras to a processor, functions to distribute images captured from the cameras to a processor.

Step S1528, which recites processing the synchronized image pairs, functions to process at least two images captured from the cameras before aggregation in step S1530. This step may be performed to distribute a portion of the computational load into a device, such as a controller. The processing of the synchronized images in this step may include stitching, fusing, super-resolution, 3D image processing, object tracking, or any other suitable image processing function that may be performed on the synchronized images. The result of the processing may be new images and/or information about the images.

Within this document, the following terms are hereby defined: "Remote" means preferably more than 5 m, and more preferably at least 70 m; "Multiple cameras" means preferably more than 3 cameras, and more preferably 16-256 cameras; "Synchronized" means preferably less than 1 microsecond, and more preferably around 40 nanoseconds; and "Low latency" means preferably less than 1 millisecond, and more preferably less than 0.05 milliseconds.

As a person skilled in the art will recognize from the previous detailed description and from the figures and claims, modifications and changes can be made to the preferred embodiments of the invention without departing from the scope of this invention defined in the following claims.

I claim:

1. A controller for a surveillance system, comprising:
a first port for coupling a first camera;
a second port for coupling a second camera;
a first synchronization logic block coupled to the first port and configured to update a first cycle time register of the first camera coupleable to the first port;
a second synchronization logic block coupled to the second port and configured to update a second cycle time register of the second camera coupleable to the second port;
an image sharing logic block coupled to the synchronization logic block of the first port and the synchronization logic block of the second port;
an image pair-processing logic block coupled to the image sharing logic block;
an information aggregation logic block coupled to the first synchronization logic block and the second synchronization logic block through the image pair-processing logic block and the image sharing logic block;
a synchronization channel connected to a synchronization signal of a synchronization controller and coupled to the synchronization logic blocks; and
an output port coupled to the information aggregation logic block.

2. The controller of claim 1, further comprising a synchronization controller with a synchronization signal output and coupled to the synchronization logic blocks through the synchronization channel.

3. A system for surveillance, comprising:
a first controller according to the controller of claim 1;
a second controller according to the controller of claim 1;
a communication channel coupled to the controllers; and
a chassis supporting the controllers.

4. The system of claim 3, wherein an output of the image sharing logic block coupled to the first port on the first controller is coupled to an image sharing logic block connecting to the first port on the second controller.

5. The system of claim 3, wherein a synchronization logic block on the first controller is coupled to a synchronization logic block on the second controller.

6. The system of claim 3, wherein the communication channel is one selected from the group consisting of PCI-Express and IEEE 1394.

7. The system of claim 5, further comprising a synchronization controller coupled to the synchronization service logic block of the first controller.

8. The system of claim 7, further comprising a synchronization channel in the communication channel, wherein the synchronization channel on the communication channel is coupled to at least two synchronization logic blocks on a controller.

9. The system of claim 3, further comprising a processor connected to the communication channel.

10. A network of systems for surveillance, comprising:
a first system according to the system of claim 3;
a second system according to the system of claim 3; and
a communication channel coupling the first system and the second system.

11. The network of claim 10, further comprising a low latency switch coupled to the first system and the second system.

12. The network of claim 10, further comprising a synchronization controller.

13. The network of claim 10, further comprising a processor coupled to the communication channel.

14. The network of claim 10, further comprising a plurality of cameras connected to the camera ports on the controllers.

15. The network of claim 14, wherein two of the plurality of cameras have at least partially overlapping fields of view.

16. A method comprising:
generating a synchronization signal comprising a continuous source of isochronous cycle start times;
periodically synchronizing cycle time registers of a plurality of cameras according to the synchronization signal;
capturing images from the synchronized cameras;
aggregating information from at least two synchronized images to main memory of a processor; and
the processor processing the aggregated information.

17. The method of claim 16, further comprising the step of distributing synchronized images from at least two cameras to a processor.

18. The method of claim 17, further comprising the step of processing the synchronized image pairs.

19. The method of claim 16, wherein synchronizing cycle time registers of a plurality of cameras includes setting values for the bus_time and cycle_time registers on a communication channel according to the synchronization signal.

20. The method of claim 17, wherein processing the aggregated processed synchronized images includes one application selected from the group consisting of combining optical images with thermal images to produce thermal signature verified images, combining images to create a 3-dimensional image, and tracking objects across multiple camera fields of view.

21. A network of systems for surveillance, comprising:
at least two subsystems, wherein each subsystem includes:
at least two modular controlled cards for a surveillance system wherein each controller card includes a first port for coupling a camera, a second port for coupling a camera, a first synchronization field programmable gate array (FPGA) logic block coupled to the first port and configured to update a cycle time register of a camera coupled to the first port, a second synchronization FPGA logic block coupled to the second port and configured to update a cycle time register of a camera coupled to the second port, an image sharing FPGA logic block coupled to the synchronization FPGA logic block of the first port and the synchronization FPGA logic block of the second port, an image pair-processing FPGA logic block coupled to the image sharing FPGA logic block, an information aggregation FPGA logic block coupled to the output of the image pair-processing FPGA logic block, and an output port coupled to the information aggregation FPGA logic block;
a communication channel coupled to the output port of the controller cards; and
a chassis supporting the controller cards;
a low latency switch coupled to the first system and the second system;
a processor coupled to the communication channel; and
a synchronization controller coupled to a synchronization channel on the communication channel coupled to at least two synchronization logic blocks on a controller, wherein the synchronization controller outputs a continuous source for isochronous cycle start times onto the synchronization channel.

22. The network of claim 21, further comprising a plurality of cameras connected to the camera ports on the controllers.

23. The network of claim 22, wherein two of the plurality of cameras have at least partially overlapping fields of view.

* * * * *